US011487181B2

(12) United States Patent
Srinivasan et al.

(10) Patent No.: US 11,487,181 B2
(45) Date of Patent: Nov. 1, 2022

(54) LOW DRIVE VOLTAGE MULTI-WAVELENGTH TRANSMITTER

(71) Applicant: Hewlett Packard Enterprise Development LP, Houston, TX (US)

(72) Inventors: Sudharsanan Srinivasan, Santa Barbara, CA (US); Di Liang, Santa Barbara, CA (US); Geza Kurczveil, Santa Barbara, CA (US); Raymond G. Beausoleil, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 193 days.

(21) Appl. No.: 16/946,653

(22) Filed: Jun. 30, 2020

(65) Prior Publication Data

US 2021/0405499 A1    Dec. 30, 2021

(51) Int. Cl.
*H04B 10/50* (2013.01)
*H04B 10/25* (2013.01)
(Continued)

(52) U.S. Cl.
CPC ......... *G02F 1/225* (2013.01); *G02B 6/29343* (2013.01); *H04B 10/25* (2013.01);
(Continued)

(58) Field of Classification Search
CPC ...... G02F 1/225; G02F 1/212; G02F 2203/15; G02F 2203/54; G02B 6/29343;
(Continued)

(56) References Cited

U.S. PATENT DOCUMENTS 5,530,709 A    6/1996 Waarts et al.
6,233,045 B1    5/2001 Suni et al.
(Continued)

OTHER PUBLICATIONS

Geza et al., "On-chip Hybrid Silicon Quantum Dot Comb Laser with 14 Errorfree Channels", HPE, Jul. 2018, 3 pages.
(Continued)

*Primary Examiner* — Leslie C Pascal
(74) *Attorney, Agent, or Firm* — Sheppard Mullin Richter & Hampton LLP

(57) ABSTRACT

Examples herein relate to optical systems. In particular, implementations herein relate to an optical system including an optical transmitter configured to transmit optical signals. The optical transmitter includes a first optical source coupled to an input waveguide and configured to emit light having different wavelengths through the input waveguide. The optical transmitter includes a Mach-Zehnder interferometer that includes a first arm and a second arm. The MZI further includes a first optical coupler configured to couple the emitted light from the input waveguide to the first and second arms and an array of two or more second optical sources coupled to the first arm. Each of the two or more second optical sources are configured to be injection locked to a different respective wavelength of the emitted light transmitted from the first optical source. The MZI further includes a second optical coupler configured to combine the emitted light from the first and second arms after propagating therethrough.

20 Claims, 6 Drawing Sheets

(51) Int. Cl.
*H04J 14/02* (2006.01)
*G02F 1/225* (2006.01)
*G02B 6/293* (2006.01)
*G02F 1/21* (2006.01)

(52) U.S. Cl.
CPC .......... *H04B 10/503* (2013.01); *G02F 1/212* (2021.01); *H04B 10/506* (2013.01); *H04J 14/02* (2013.01)

(58) Field of Classification Search
CPC .... H04B 10/25; H04B 10/503; H04B 10/506; H04J 14/02
See application file for complete search history.

(56) References Cited

U.S. PATENT DOCUMENTS

| | | | |
|---|---|---|---|
| 7,099,586 | B2 | 8/2006 | Yoo |
| 8,842,998 | B2 | 9/2014 | Delfyett et al. |
| 9,088,371 | B2 | 7/2015 | Witzens |
| 9,287,993 | B1 | 3/2016 | Huynh et al. |
| 9,385,506 | B2 | 7/2016 | Anandarajah et al. |
| 10,243,328 | B2 | 3/2019 | Zhang et al. |
| 10,320,515 | B1 | 6/2019 | Koch et al. |
| 2003/0034538 | A1 | 2/2003 | Brophy et al. |
| 2004/0233945 | A1 | 11/2004 | Komine et al. |
| 2005/0013337 | A1 | 1/2005 | Jung et al. |
| 2014/0161148 | A1 | 6/2014 | Osinki et al. |
| 2016/0119057 | A1 | 4/2016 | De Dobbelaere et al. |
| 2017/0010419 | A1* | 1/2017 | Jiang .................... H01S 5/5027 |
| 2017/0090268 | A1* | 3/2017 | O'Sullivan ........... G02F 1/0123 |
| 2018/0212682 | A1* | 7/2018 | Chen .................... H04B 10/675 |
| 2018/0294622 | A1 | 10/2018 | Liang et al. |
| 2019/0020419 | A1* | 1/2019 | Pelc .................... H04B 10/5561 |
| 2019/0028203 | A1 | 1/2019 | Kuse et al. |
| 2019/0113686 | A1 | 4/2019 | Matres et al. |
| 2019/0310422 | A1 | 10/2019 | Seyedi et al. |
| 2019/0393962 | A1 | 12/2019 | Zhang et al. |
| 2020/0119813 | A1 | 4/2020 | Zhang et al. |
| 2021/0088740 | A1* | 3/2021 | Liang .................... H04B 10/67 |
| 2022/0019023 | A1* | 1/2022 | Ren .................... G02B 6/12007 |

OTHER PUBLICATIONS

Luecke et al., "Autostable injection locking of a 4x4 VCSEL array with on-chip master laser", SPIE Digital Library, May 1, 2000, 7 pages.

Pintus et al., "Broadband TE Optical Isolators and Circulators in Silicon Photonics Through Ce:YIG Bonding", Journal of Lightwave Technology, vol. 37, No. 5, Mar. 1, 2019, pp. 1463-1473.

RP Photonics "Encyclopedia of Laser Physics and Technology—injection locking, single-frequency laser", available online at <https://web.archive.org/web/20160419031911/https://www.rp-photonics.com/injection_locking.html>, Apr. 19, 2016, 2 Pages.

Fei Wang, "Tunable 12×10 GHz mode-locked semiconductor fiber laser incorporating a Mach-Zehnder interferometer filter", Optics & Laser Technology, vol. 43, Issue 4, Jun. 2011, pp. 848-851.

Kobayashi et al., "Automatic frequency control in a semiconductor laser and an optical amplifier," in Journal of Lightwave Technology, vol. 1, No. 2, Jun. 1983, pp. 394-402.

Liang et al., "Heterogeneous silicon light sources for datacom applications", Optical Fiber Technology, vol. 44, 2018, pp. 43-52.

Vasseur et al., "Alternate Multiwavelength Picosecond Pulse Generation by Use of an Unbalanced Mach-Zehnder Interferometer in a Mode-locked Fiber Ring Laser", IEEE Journal of Quantum Electronics, vol. 43, No. 1, Jan. 2007, pp. 85-96.

Vasseur, J. et al., "Alternate Multiwavelength Modelocked Fiber Laser", IEEE Photonics Technology Letters, vol. 16, No. 8, Aug. 2004, pp. 1816-1818.

* cited by examiner

LOW DRIVE VOLTAGE MULTI-WAVELENGTH TRANSMITTER

STATEMENT OF GOVERNMENT RIGHTS

This invention was made with Government support under Agreement Number H98230-18-3-0001. The Government has certain rights in the invention.

BACKGROUND

Optoelectronic communication (e.g., using optical signals to transmit electronic data) is becoming more prevalent as a potential solution, at least in part, to the ever increasing demand for high bandwidth, high quality, and low power consumption data transfer in applications such as high performance computing systems, large capacity data storage servers, and network devices. Wavelength division multiplexing (WDM) is useful for increasing communication bandwidth by combining and sending multiple different data channels or wavelengths from one or more optical sources over an optical fiber. Generally, optical systems or transmitters include an optical source configured to emit one or more wavelengths via which data signals are transferred. An improved optical system or transmitter having an array of optical sources injection locked to a multi-wavelength optical source and nested within a Mach-Zehnder interferometer (MZI) as described herein may provide one or more of the following advantages: reduced driver power, reduced overall optical transmitter footprint, increased or higher transmitted output power, and high linear output which can enable multilevel pulse amplitude modulation (PAM-M) using simplified electrical drivers.

BRIEF DESCRIPTION OF THE DRAWINGS

Certain examples are described in the following detailed description and in reference to the drawings, in which:

FIGS. 3A-3C illustrate charts of modulation transfer functions at each stage wherein FIG. 3A illustrates ring laser output phase vs. input drive, FIG. 3B illustrates optical output amplitude vs. phase difference between first and second arms of the MZI of FIG. 1, and FIG. 3C illustrates the combined response of FIGS. 3A and 3B as output optical amplitude vs. input drive;

DETAILED DESCRIPTION OF SPECIFIC EXAMPLES

The present disclosure describes various examples of optical systems (e.g., optical transceivers) that include an optical transmitter. According to embodiments as described herein, the optical transmitter includes a first multi-wavelength optical source configured to emit light having different wavelengths and an array of second optical sources injection locked to the first multi-wavelength optical source. The second optical sources are nested within a Mach-Zehnder interferometer (MZI). Each of the second optical sources are configured to be injection locked to a different respective wavelength of the emitted light transmitted.

Typically, multiplexing single wavelength transmitters increases die size. Some conventional solutions can also require multiple epitaxial materials or longer fabrication cycle times. Large drive swings for modulation implies larger driver power consumption. Non-linear optical modulation response implies that PAM-M drivers may need increased complexity further increasing die area and power.

In some implementations according to the present disclosure, the first optical source is a reference comb laser and the two or more second optical sources are injection locked ring lasers. Injection locking two or more (e.g., multiple) ring lasers nested within an MZI to a reference comb laser as described herein can be used to provide a large throughput wavelength division multiplexing (WDM) optical transmitter. Simultaneous generation or injection locking of multiple linear transmitters at different wavelengths for large data throughput over a single fiber results in a low or decreased overall footprint architecture. Low drive voltage ensures low power consumption. Further, linear modulation allows for PAM-M transmission on each wavelength to scale-up throughput and thereby reduce costs. Further advantages and improvements with respect to certain implementations of the optical transmitters or systems described herein are discussed in more detail below.

An "optical fiber" as described herein can refer to a single optical fiber (e.g., including a core, a cladding, a buffer and one or more layers of protective jackets) to provide either unidirectional or bidirectional optical communication (e.g., both transmit and receive communications in an optical network). A signal or communication path of an optical fiber can extend contiguously and uninterrupted between optical modules. In other examples, the optical fiber includes an array of two or more fibers or two or more fibers connected (e.g., sequentially) via fiber-to-fiber connections such that the fibers function or perform as a single communication path. To avoid unnecessarily obscuring the description, conventional or well-known structures and components of optical systems are omitted from the description, for example, optical connectors, tuning circuitry, sensors, and CMOS drivers/receivers to tune, convert, or modulate optical signals or resonators.

Figure 1:
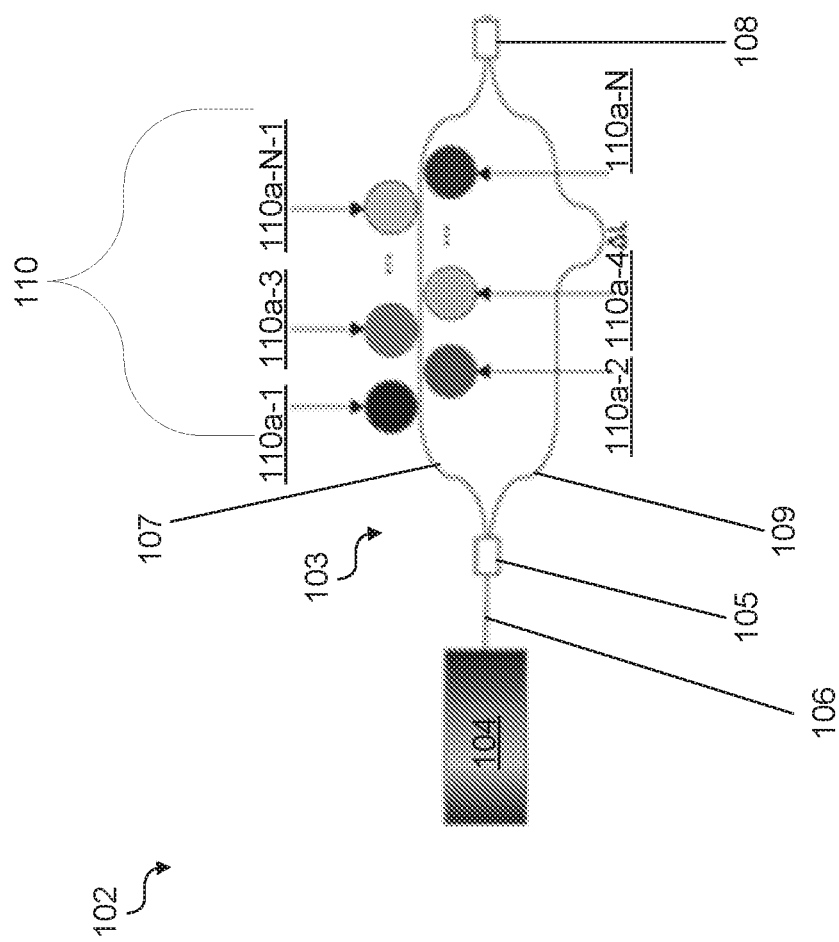
FIG. 1 schematically illustrates an example of an optical transmitter according to the present disclosure.

FIG. 1 illustrates and example of an optical transmitter 102 and components thereof according to the present disclosure. The optical transmitter 102 is configured to transmit optical signals. The optical transmitter 102 includes at least one first optical source 104 coupled to an input waveguide 106 and configured to emit light (e.g., carrier waves) having different wavelengths or channels through the input waveguide 106. The input waveguide 106 can be, for example, a bus waveguide. The optical transmitter 102 can include an optical coupler (not illustrated in FIG. 1) to couple the emitted light from the first optical source 104 to the input waveguide 106. Such an optical coupler can be, for example, a grating coupler. In other examples, the optical coupler can include, but is not limited to a: prism, collimating lens, light-turn lens, parabolic reflector, spot-size converter, inversely tapered waveguide, bent waveguide, or a combination thereof.

The optical transmitter 102 further includes a Mach-Zehnder interferometer (MZI) 103 that includes a first arm 107 and a second arm 109 (e.g., a first waveguide and a second waveguide). The MZI 103 further includes a first optical coupler 105 configured to couple the emitted light from the input waveguide 106 to the first and second arms 107 and 109. The MZI 103 includes an array of two or more second optical sources 110 (e.g., up to N number of second optical sources, where N can equal four, eight, sixteen, thirty-two, sixty-four) coupled to the first arm 107. Each of the two or more second optical sources 110 are injection locked to a different respective wavelength of the emitted light (e.g., on which electrical data signals can be modulated) transmitted from the first optical source 104. The MZI 103 further includes a second optical coupler 108 configured to combine the emitted light from the first and second arms 107 and 109 after propagating therethrough.

The two or more second optical sources 110 are identified individually as second optical sources 110a-1, 110a-2, up to 110a-n, respectively injection locked or configured to be injection locked to a different respective wavelengths of the emitted light transmitted via the input waveguide 106 from the first optical source 104. In some implementations, the first optical source 104 can include a multi-wavelength comb laser (e.g., a reference comb laser) configured to generate or output a plurality of different laser or comb lines (e.g., tones, frequencies, or wavelengths) and the array of two or more second optical sources 110 can include two or more ring lasers (e.g., injection locked ring lasers) injection locked to different respective wavelengths of the multi-wavelength comb laser. In other examples, the first optical source 104 can include an array or bank of two or more single wavelength lasers or sources. The injection locked ring lasers can be directly-modulated ring lasers. For example, the injection locked ring lasers can be directly modulated quantum dot (QD) microring lasers having micro-cavities tunable (e.g., via bias or thermal tuning as described in more detail below) to different resonant wavelengths corresponding to different respective wavelengths of the light emitted from the reference comb laser or multiple reference single wavelength lasers.

The multi-wavelength comb laser output includes multiple optical frequencies with a fixed separation (e.g., the comb-teeth spacing) between any two adjacent frequencies. As described in more detail below, this output is then split into the first and second arms 107 and 109 of the MZI 103, where the first arm 107 is coupled to the array of two or more ring lasers and the second arm 109 has a delay length ΔL relative to the first arm 107.

The first and second optical couplers 105 and 108 can be a splitter and a combiner, respectively. For example, the first optical coupler 105 can be an input coupler or passive power splitter (e.g., a y-branch waveguide, a 1×2 multi-mode interference coupler). The second optical coupler 108 can be an output coupler or combiner (e.g., a 2×1 multi-mode interference coupler). In this manner, the emitted light from the first optical source 104 is output (e.g., with same wavelengths, total number of wavelengths) to both the first and second arms 107 and 109 of the MZI such that the array of two or more second optical sources 110 coupled to the first arm 107 is injection locked to the same respective wavelengths of the emitted light as are propagating through the second arm 109. In such examples, due to gain in the first arm from the second optical sources 110, a ratio of the power levels of the wavelengths split by the first optical coupler 105 between the first and second arms is designed or configured such that the power levels of the wavelengths recombined at the second optical coupler 108 are equal or substantially equal. In some examples, the first optical coupler 105 can be tunable to compensate for fabrication error, imperfections, or tolerance.

While respective wavelengths of the emitted light do propagate through the second arm 109, as illustrated in FIG. 1, only the first arm 107 is coupled to the array of two or more second optical sources 110. The second arm 109 (e.g., a reference arm of the MZI) is not coupled directly to any of the optical sources, but includes the delay length relative to the first arm 107 as described in more detail below. The wavelengths of the emitted light can then be combined by or interfere at the second optical coupler 108 after propagating through the first and second arms 107 and 109 (e.g., to be transmitted off a chip or device the optical transmitter is disposed on via an optical fiber and an output waveguide as described in more detail below with respect to FIG. 5).

As described herein, the components of the optical transmitter 102 can all be integrated or formed on or within a single chip, die, or photonic integrated circuit. For example, the first optical source 104 and the MZI 103 can be heterogeneously integrated on a silicon or silicon on insulator substrate. In some examples, the reference comb laser or multiple reference single wavelength lasers and the array of two or more injection locked ring lasers can be monolithically grown or formed on a silicon or silicon on insulator substrate.

As illustrated in FIG. 1, the second arm 109 has a delay length ΔL relative to the first arm 107 such that transmit wavelengths have a phase difference of π/2 between the first and second arms. The delay length ΔL of the second arm 109 is configured or designed such that each frequency of the first optical source 104 (e.g., comb laser output) is at a quadrature of the MZI 103. In other words the free-spectral range (FSR) of the MZI 103 is the same as the comb-teeth spacing of the first optical source 104 (e.g., the multi-wavelength comb laser). The delay length ΔL of the second arm 109 can be obtained or designed according to the following equations.

$$\beta_i \Delta L = 2\pi(P + i) + (\pi/2) \ \forall \ i \in \{0, 1, 2, \ldots, N-1\}, P \in \mathbb{Z}_+ \quad \text{(Equation 1)}$$

$$\beta_i = \frac{2\pi n_{\text{eff}}(\lambda_i)}{\lambda_i} \quad \text{(Equation 2)}$$

$n_{\text{eff}}$ is the effective refractive index, λ is the wavelength of any given comb mode, P is a positive integer, N is the number of injection locked lasers, i is the iterate index.

An optical transmitter 102 or MZI 103 as described herein can also require that the optical phase on the second arm 109 (e.g., the reference arm) be tunable for fabrication error compensation. For example, including a heater above the second arm 109 or waveguide as a phase shifter in addition to the delay length can provide tuning as necessary to compensate for fabrication error or tolerance. Such an approach for realizing a same phase shift for all comb lines of a reference comb laser can be satisfactory for small to medium comb bandwidths (e.g., 5 nm-10 nm). However, for larger bandwidths (e.g., greater than 10 nm and limited on the upper range/maximum by a span of the frequency comb), dispersion in effective refractive index of the second arm 109 or waveguide may make obtaining a 90 degree or π/2 phase shift over a full span difficult when using only a delay length. Therefore; in some examples, the MZI 103 includes a broadband semiconductor-insulator-semiconductor (SIS)

capacitor phase shifter (e.g., instead of a delay length) which can utilize a plasma dispersion effect having much less wavelength dependence.

Figure 2:
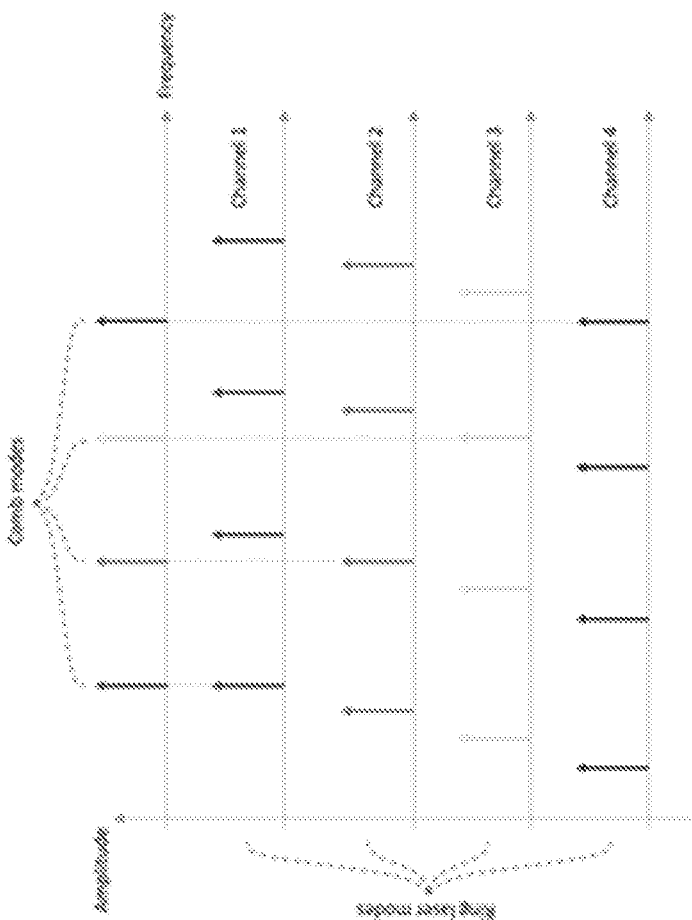
FIG. 2 is a chart that schematically illustrates an example of a comb-teeth spacing of a reference comb laser of the optical transmitter relative to the free spectral range (FSR) of four injection locked ring lasers of the optical transmitter of FIG. 1 such that only one frequency of each injection locked ring laser overlaps with only one respective frequency of the reference comb laser different from the other injection locked ring lasers.

With reference to FIG. 2, another design parameter is the FSR of the ring lasers (e.g., the second optical sources 110) which have to be different from the comb-teeth spacing of the comb laser (e.g., the first optical source 104) such that only one frequency of one ring laser can overlap with one frequency of the comb laser output and different from the other respective ring lasers. One method or manner to ensure such a configuration is to select prime numbers for the ring laser FSRs and the comb-teeth spacing. For example, when N=4 (e.g., 4 ring lasers) or the comb-teeth spacing can be selected or configured to be 89 GHz while the 4 ring laser FSRs can be selected or configured to be 101 GHz, 103 GHz, 107 GHz and 109 GHz. In this manner, the difference between the comb-teeth spacing and each FSR is sufficiently large to be outside the injection locking bandwidth for all but one frequency. In other words, as illustrated in FIG. 2, only one ring laser mode for each channel (e.g., 4 channels when N=4) of the optical transmitter 102 overlaps with only one mode of the comb laser different from the other ring lasers or channels.

Further, independent electrical data signals reaching each ring laser modulate an effective cavity length of the ring laser. This can be achieved by changing a refractive index of the ring laser medium using gain current or an independent electrode to inject or deplete carriers in the material supporting the optical mode (e.g., bias tuning). In other examples, thermal tuning (e.g., with a heater) can be used in addition to or instead of bias tuning to change a refractive index of the ring laser medium.

Figure 3A:
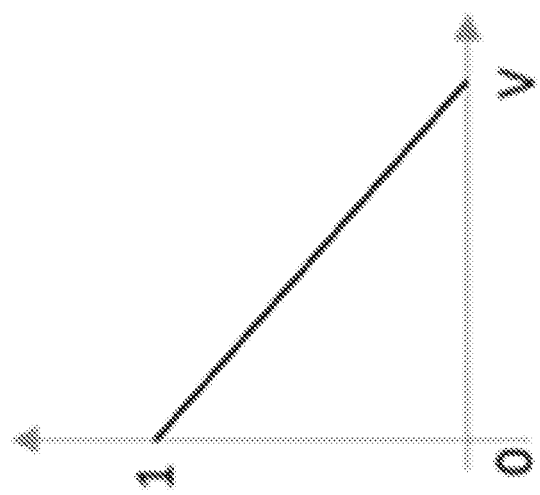
Figure 3B:
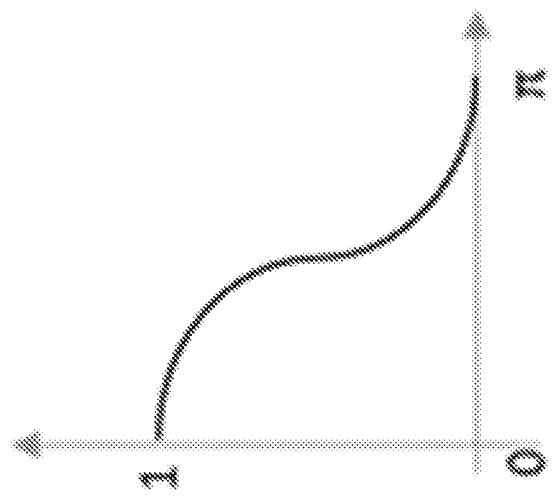
Figure 3C:
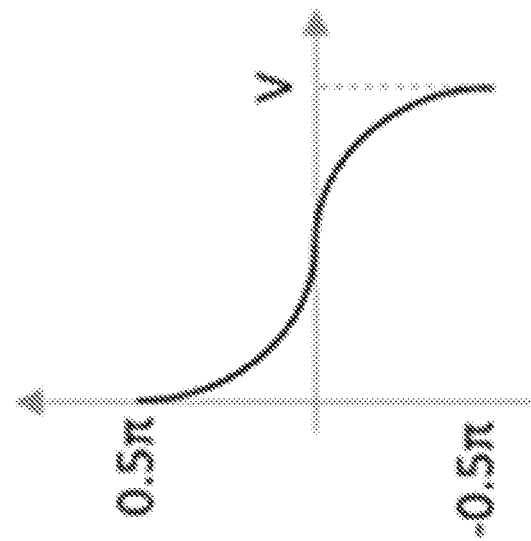

With reference to FIGS. 3A-3C together, each of the respective ring lasers being injection locked to the reference comb laser will not change in optical output frequency. Instead, as illustrated in FIG. 3A, a large output phase shift follows an inverse sine as a function of an offset frequency of the ring laser and the reference comb laser. The output phase shifted light when combined with the light from the reference arm (e.g., the second arm 109) coming directly from the reference comb laser (e.g., without passing through the ring lasers) produces an interference pattern that follows a sine as a function of the phase difference between the two arms (e.g., the first and second arms 107 and 109) as illustrated in FIG. 3B. The combination of the inverse sine and sine transfer functions depicted in FIGS. 3A and 3B provides a linear change in optical output with input drive as illustrated in FIG. 3C.

The resonance characteristics of the injection locked injection locked ring lasers on the first arm 107 can also provide energy-efficient and selective amplification of individual wavelengths output or emitted from the reference comb laser with little added noise and high saturation power (e.g., due to each ring only amplifying a single wavelength and not the entire spectrum of wavelengths or comb) of the reference comb laser. Each ring laser can also be biased independently (e.g., independently of the other ring lasers at different biasing currents) to equalize a comb shape of the reference comb laser (e.g., such that the power level across the different wavelengths of the injection locked ring lasers are equivalent or substantially equivalent.

Figure 4:
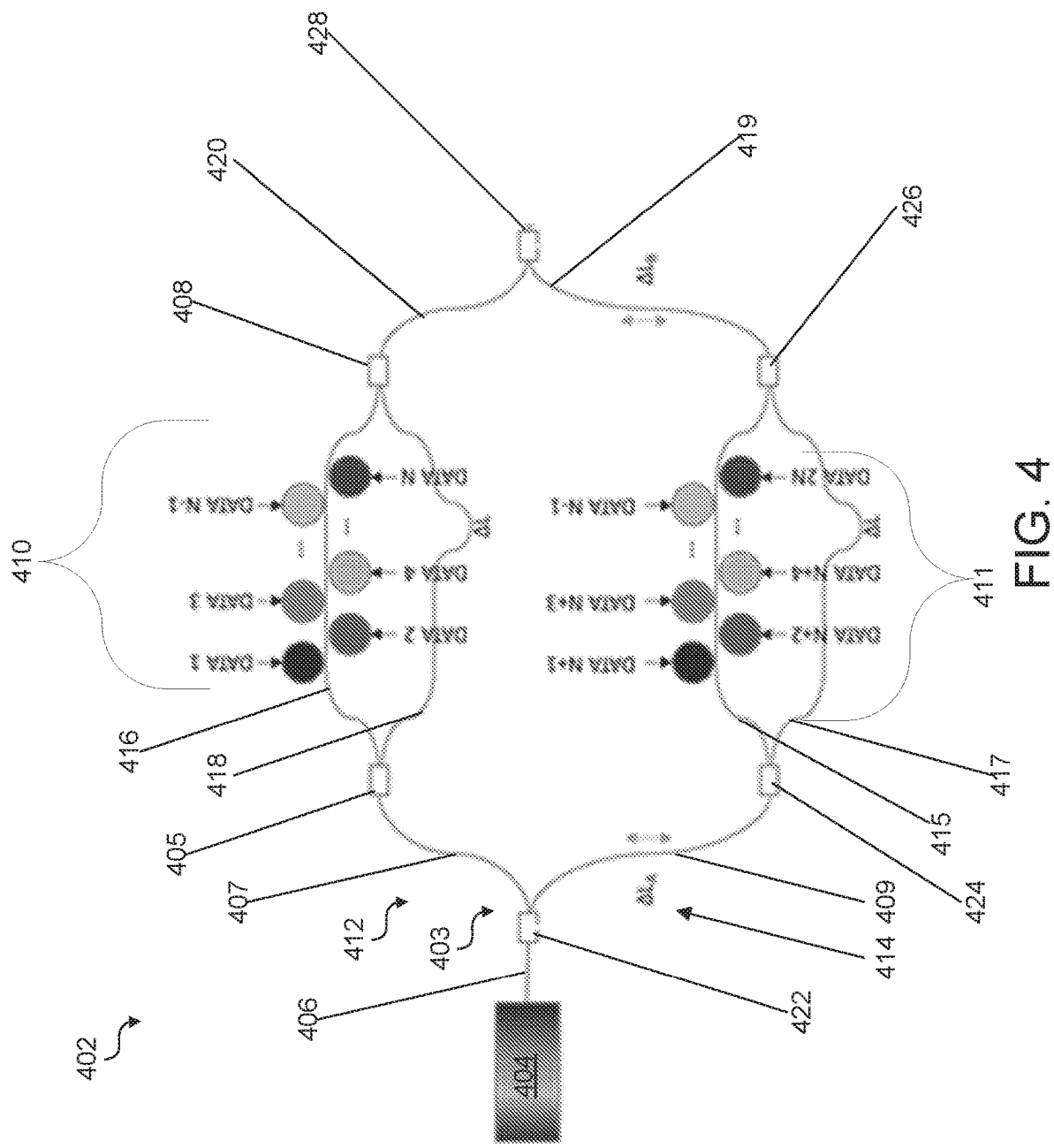
FIG. 4 schematically illustrates an example of another optical transmitter according to the present disclosure.

FIG. 4 illustrates another example optical transmitter 402 in accordance with the present disclosure. The optical transmitter 402 can include one or more of any of the components, in whole or in part, as described above with respect to the optical transmitter 102 (e.g., where similar reference identifiers refer to similar or identical components). The optical transmitter 402 can have double the data rate using IQ modulation as the optical transmitter 102. The optical transmitter 402 includes a first optical source 404 (e.g., a reference multi-wavelength comb laser, bank of two or more reference single wavelength lasers) coupled to an input waveguide 406 and configured to emit light having different wavelengths through the input waveguide 406. The optical transmitter 402 includes a Mach-Zehnder interferometer 403 that includes a first optical coupler 422 (e.g., an input coupler or passive power splitter) configured to couple the emitted light from the input waveguide to first and second arms 407 and 409 of respective first and second branches 412 and 414 of the MZI 403.

The first optical coupler 422 splits the emitted light such that a first set of wavelengths of the emitted light is coupled to the first arm 407 and a second set of wavelengths of the emitted light (e.g., having same wavelengths as the first set) is coupled to the second arm 409. The first and second set of wavelengths split by the first optical coupler 422 include the same wavelengths and number of wavelengths and can have a same or substantially same power level (e.g., each of the first and second sets having one half the total power level as output by the first optical source 404).

The first branch 412 includes the first arm 407 and third, fourth, and seventh arms 416, 418, and 420 (e.g., waveguides) and a second optical coupler 405 (e.g., an input coupler or passive power splitter) configured to couple light with the first set of wavelengths from the first arm 407 to the third and fourth arms 416 and 418. The first branch 412 also includes a first array of two or more second optical sources 410 (e.g., ring lasers identified individually as second optical sources Data 1, Data 2, up to Data N) coupled to the third arm 416. Each of the two or more second optical sources 410 are injection locked to a different respective wavelength of the first set of wavelengths of the emitted light transmitted from the first optical source 404.

As described above with respect to the optical transmitter 102, the second optical coupler 405 splits the emitted light from the first optical source 404 such that it is output (e.g., with same wavelengths, total number of wavelengths) to both the third and fourth arms 416 and 418. The fourth arm 418 also includes a delay length ΔL relative to the third arm 416 (e.g., as discussed above with respect to the first and second arms 107 and 109 such that each frequency of the comb laser output is at quadrature of the MZI 403). The array of two or more second optical sources 410 coupled to the third arm 416 is injection locked to the same respective wavelengths of the emitted light as are propagating through the fourth arm 418 that is not directly coupled to optical sources.

In such examples, as similarly discussed above with respect to the optical transmitter 102, due to gain in the third arm 416 from the second optical sources 410, a ratio of the power levels of the first set of wavelengths split by the second optical coupler 405 between the third and fourth arms 416 and 418 is designed or configured such that the power levels of the wavelengths recombined at a third optical coupler 408 (e.g., after propagating through the third and fourth arms) are equal or substantially equal. In some examples, the second optical coupler 405 can be tunable to compensate for fabrication error, imperfections, or tolerance.

The first branch 412 further includes the third optical coupler 408 (e.g., an output coupler or combiner) configured to combine the emitted light from the third and fourth arms 416 and 418 after propagating therethrough. The seventh arm 420 is coupled to the third coupler 408 to receive the respective combined emitted light from the third and fourth arms 416 and 418 from the third coupler 408.

The second branch 414 includes the second arm 409 and fifth, sixth, and eighth arms 415, 417, and 419 (e.g., waveguides) and a fourth optical coupler 424 (e.g., an input coupler or passive power splitter) configured to couple light with the second set of wavelengths from the second arm 409 to the fifth and sixth arms 415 and 417. The second branch 414 also includes a second array of two or more second optical sources 411 (e.g., ring lasers identified individually as second optical sources Data N+1, Data N+2, up to Data 2N) coupled to the fifth arm 415. Each of the two or more second optical sources 411 are injection locked to a different respective wavelength of the second set of wavelengths of the emitted light transmitted from the first optical source 404.

As described above with respect to the second optical coupler 405, the fourth optical coupler 424 splits the emitted light from the first optical source 404 such that it is output (e.g., with same wavelengths, total number of wavelengths) to both the fifth and sixth arms 415 and 417. The sixth arm 417 also includes a delay length ΔL relative to the fifth arm 415 (e.g., as discussed above with respect to the first and second arms 107 and 109 such that each frequency of the comb laser output is at a quadrature of the MZI 403). The array of two or more second optical sources 411 coupled to the fifth arm 415 is injection locked to the same respective second set of wavelengths of the emitted light as are propagating through the sixth arm 417 that is not directly coupled to optical sources.

In such examples, as similarly discussed above with respect to the first branch 412, due to gain in the fifth arm 415 from the second optical sources 411, a ratio of the power levels of the second set of wavelengths split by the fourth optical coupler 424 between the fifth and sixth arms 415 and 417 is designed or configured such that the power levels of the wavelengths recombined at a fifth optical coupler 426 (e.g., after propagating through the fifth and sixth arms) are equal or substantially equal. In some examples, the fourth coupler 424 can be tunable to compensate for fabrication error, imperfections, or tolerance.

In some examples, a monitoring and control circuit or logic can be included to monitor and equalize power levels of the first set of wavelengths, second set of wavelengths, or both prior to entering the arms of the respective first and second branches 412 and 414 of the MZI 403.

Generally, first optical sources (e.g., a reference comb laser, two or more single wavelength lasers) and injection locked second optical sources (e.g., ring lasers) as described herein see or are exposed to the same or similar temperature fluctuations (e.g., due to being closely integrated). However, in some examples, any of the optical transmitters described herein can include a phase locked loop 650 as part of a monitoring and control circuit or logic to ensure injection locking is achieved during start-up and maintained during operation.

Figure 6:
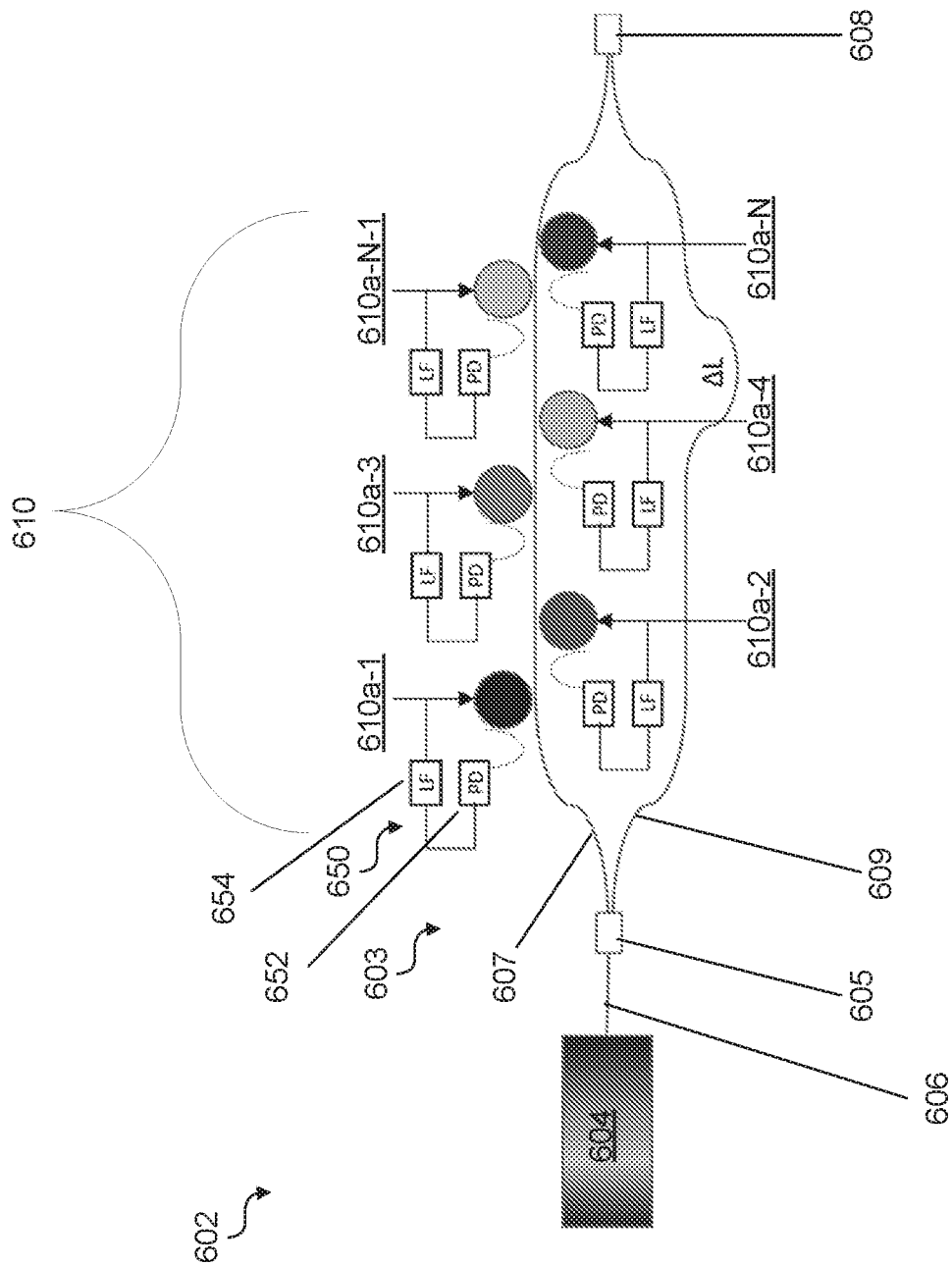
FIG. 6 schematically illustrates an example of another optical transmitter according to the present disclosure.

For example, with reference to the optical transmitter 602 of FIG. 6 which can be configured similarly to the optical transmitter 102, each of the respective second optical sources 610 can include respective phase locked loops 650. Each of the phase locked loops 650 can include an on-chip photodetector 652 (e.g., a monitoring photodetector) tapped or otherwise coupled to a small portion of the respective injection locked second optical source 610 and a low pass filter 654 to ensure injection locking is achieved during start-up and maintained during operation. In other examples, voltages of each of the injection locked second optical sources 610 can be used to form such a phase locked loop.

The second branch 414 further includes the fifth optical coupler 426 (e.g., an output coupler or combiner) configured to combine the emitted light from the fifth and sixth arms 415 and 417 after propagating therethrough. The eighth arm 419 is coupled to the fifth coupler 426 to receive the respective combined emitted light from the fifth and sixth arms 415 and 417 from the fifth coupler 426. The MZI 403 further includes a sixth optical coupler 428 configured to combine the emitted light from the seventh and eighth arms 420 and 419 after propagating therethrough (e.g., to be sent or transmitted to an optical receiver via an optical fiber).

As described above, individual wavelengths of the first optical source 404 or reference comb laser that the first and second arrays of second optical sources 410 and 411 or ring lasers are injection locked to can be modulated with electrical data signals (e.g., modulated via tuning circuitry and external or integrated CMOS drivers) and sent to an optical receiver (e.g., via an optical fiber) as described in more detail below with respect to optical system 500. While the second optical sources 410 and 411 are injection locked to same respective optical wavelengths as described above, the first array of second optical sources 410 are modulated with different electrical data signals relative to the second array of optical sources 411.

As illustrated in FIG. 4, the second branch 414 includes a first delay length $\Delta L_A$ and a second delay length $\Delta L_B$ relative to the first branch 412 of the MZI 403. The second arm 409 of the second branch 414 includes the first delay length relative to the first arm 407 of the first branch 412. The eighth arm 419 of the second branch 414 includes the second delay length relative to the seventh arm 420 of the first branch 412. A combined difference in path length between the first and second arms and the seventh and eighth arms (e.g., $\Delta L_A + \Delta L_B$) is selected or configured such that all wavelengths of the emitted light transmitted from the first optical source 404 have a phase difference of 90 degrees between the first and second branches 412 and 414 (e.g., between the first and second set of wavelengths) of the MZI 403. Additionally, together with PAM-M modulation such an optical transmitter 402 can support $M^2$ QAM on each of the N wavelengths of the emitted light giving a total throughput of $N*\log_2(M^2)$ times the single channel datarate.

Figure 5:
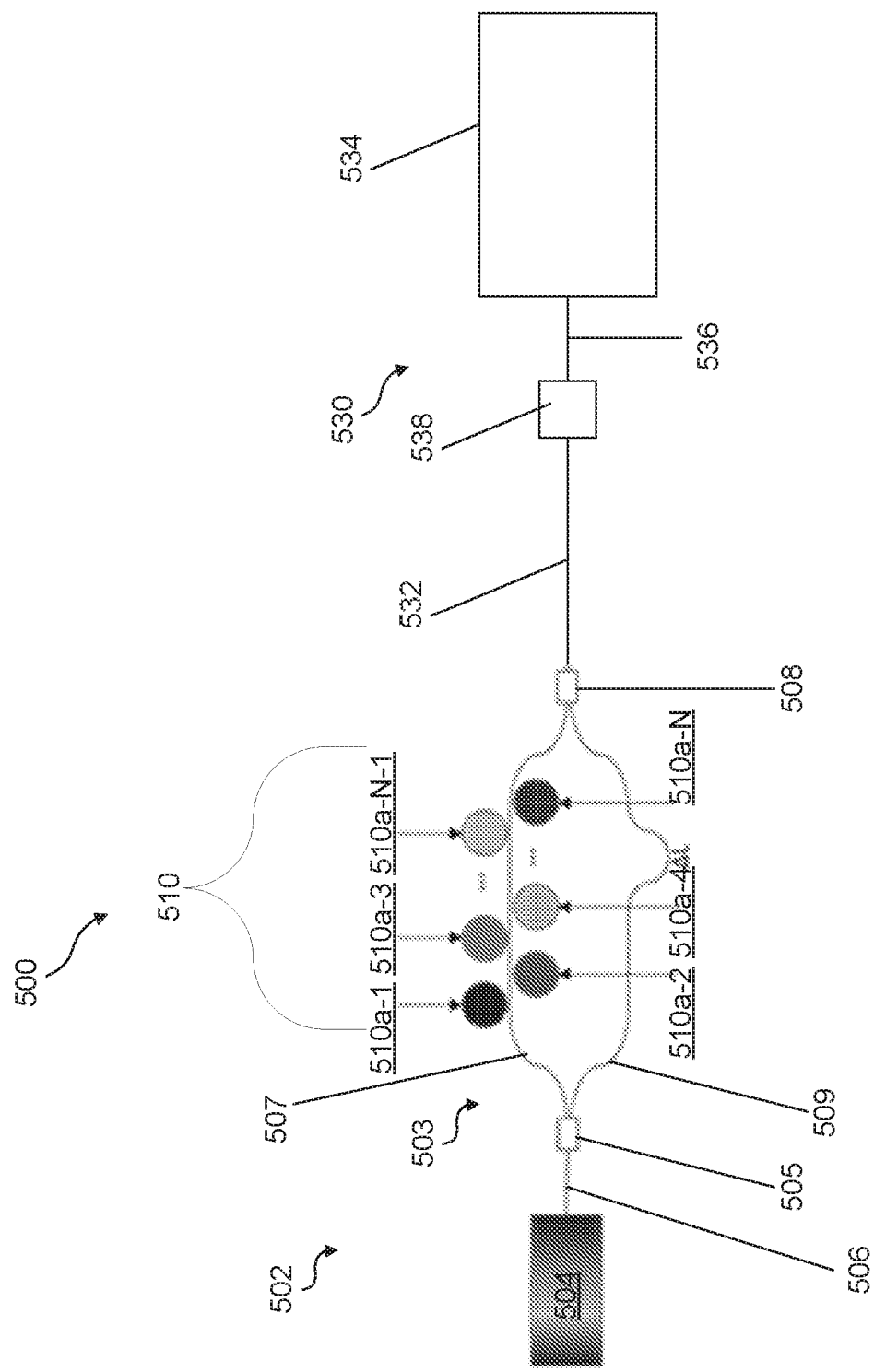
FIG. 5 schematically illustrates an example of an optical system that can include one or more of any of the optical transmitters as described herein according to the present disclosure.

With reference to FIG. 5, the optical system 500 includes an optical transmitter 502 coupled to an optical receiver 530 via an optical fiber 532 (e.g., forming a WDM optical link). The optical transmitter 502 can be configured similarly or identically to the optical transmitters 102 and 402 as described above. The optical transmitter 502 includes one or more components, in whole or in part, as the optical transmitters 102 and 402. For example, a first end of the optical fiber 532 can be coupled to an output coupler 508 (e.g., the second optical coupler 108) of optical transmitter 502 (e.g., via an output waveguide). A second end of the optical fiber 532 can be coupled to the optical receiver 530.

Light output from a first optical source 504 (e.g., a reference comb laser, bank of two or more reference single wavelength lasers) with data signals modulated thereon after propagating through first and second arms 507 and 509 of an MZI 503 interferes or is combined at the output optical coupler 508. In some examples, the light can then be transmitted off a chip or device the optical transmitter 502 is disposed on via the optical fiber 532 and sent across the optical fiber 532 to be demultiplexed and converted from the optical domain to the electrical domain by the optical receiver 530 (e.g., a demultiplexer and photodetector(s) 534). The optical receiver 530 can include an input coupler 538 to couple the optical fiber 532 to a waveguide 536. In other examples, the optical transmitter 502 and the optical receiver 530 can be formed on or within a same chip such that the light is transmitted between the optical transmitter 502 and the optical receiver 530 via the optical fiber 532 on the same chip.

Further, in some examples, the optical transmitter 502 can include filter or filter blocks configured to filter out or remove unusable wavelengths of light (e.g., wavelengths with no corresponding second optical source 510). For example, such filters can be positioned or otherwise disposed between the before or after any of the optical couplers. In some examples, the filters or filter blocks are disposed in a position or location before wavelengths of light emitted from the first optical source 504 reach the second optical sources 510. In other examples, injection locking of one or more of the second optical sources 510 can be selectively turned off or reverse biased when a particular or respective wavelength is not needed (e.g., unusable). In this manner, additional optical losses associated with filter or filter blocks are avoided (e.g., reducing comb laser power consumption and ultimately overall transmitter power consumption). Additionally, the second optical source 510 with injection current turned off or reverse biased can act as a resonant absorber as well. The optical system 500 can further include control logic to tune the individual second optical sources 510 such that they are locked to respective wavelengths of first optical source 504.

An improved optical system or transmitter having an array of optical sources injection locked to a multi-wavelength optical source and nested within a Mach-Zehnder interferometer (MZI) as described herein may provide one or more of the following advantages: reduced driver power, reduced overall optical transmitter footprint, increased or higher transmitted output power, and high linear output which can enable multilevel pulse amplitude modulation (PAM-M) using simplified electrical drivers. In the foregoing description, numerous details are set forth to provide an understanding of the subject disclosed herein.

However, implementations can be practiced without some or all of these details. Other implementations can include additions, modifications, or variations from the details discussed above. It is intended that the appended claims cover such modifications and variations. The specification and drawings are, accordingly, to be regarded as illustrative rather than restrictive.

It will be recognized that the terms "comprising," "including," and "having," as used herein, are specifically intended to be read as open-ended terms of art. The term "or," in reference to a list of two or more items, covers all of the following interpretations of the word: any of the items in the list, all of the items in the list; and any combination of the items in the list. As used herein, the terms "connected," "coupled," or any variant thereof means any connection or coupling, either direct or indirect (e.g., having additional intervening components or elements), between two or more elements, nodes, or components; the coupling or connection between the elements can be physical, mechanical, logical, optical, electrical, or a combination thereof.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

The invention claimed is:

1. An optical transmitter configured to transmit optical signals, the optical transmitter comprising:
   one or more first optical sources coupled to an input waveguide and configured to emit light having different wavelengths through the input waveguide; and
   a Mach-Zehnder interferometer comprising:
      a first arm and a second arm;
      a first optical coupler configured to couple the emitted light from the input waveguide to the first and second arms;
      an array of two or more second optical sources coupled to the first arm, each of the two or more second optical sources configured to be injection locked to a different respective wavelength of the emitted light transmitted from the one or more first optical sources; and
      a second optical coupler configured to combine the emitted light from the first and second arms after propagating therethrough.

2. The optical transmitter of claim 1, wherein the second arm is not directly coupled to any optical sources.

3. The optical transmitter of claim 1, wherein the one or more first optical sources comprise a multi-wavelength comb laser.

4. The optical transmitter of claim 3, wherein the array of two or more second optical sources comprises two or more ring lasers.

5. The optical transmitter of claim 4, wherein the second arm has a delay length relative to the first arm.

6. The optical transmitter of claim 5, wherein the delay length of the second arm is configured such that each frequency of the multi-wavelength comb laser is at a quadrature of the Mach-Zehnder interferometer.

7. The optical transmitter of claim 6, wherein comb teeth spacing of the multi-wavelength comb laser is configured such that only a single frequency of each of the two or more ring lasers overlaps with any single respective frequency from an output of the multi-wavelength comb laser.

8. The optical transmitter of claim 4, wherein the first and second arms comprise first and second waveguides respectively.

9. The optical transmitter of claim 4, wherein the first optical coupler comprises a multimode interference beam splitter to split the emitted light from the multi-wavelength comb laser into first and second light beams to be propagated through the respective first and second arms of the Mach-Zehnder interferometer.

10. The optical transmitter of claim 9, wherein the emitted light is split into the first and second light beams such that same respective wavelengths of the emitted light are propagated through the first and second arms respectively.

11. The optical transmitter of claim 9, wherein the second optical coupler comprises a multimode interference coupler to combine the first and second light beams into a single light beam after propagating through the first and second arms respectively.

12. The optical transmitter of claim 11, further comprising an optical fiber having a first end coupled to an output end of the Mach-Zehnder interferometer and wherein the combined single light beam is output onto the optical fiber.

13. The optical transmitter of claim 12, further comprising an output waveguide disposed between the optical fiber and the output end of the Mach-Zehnder interferometer.

14. The optical transmitter of claim 12, wherein a second end of the optical fiber is coupled to an optical receiver such that the combined single light beam can be transmitted from the optical transmitter to the optical receiver via the optical fiber.

15. The optical transmitter of claim 12, wherein the first optical source and the Mach-Zehnder interferometer are integrated together on a single photonic integrated circuit.

16. An optical transmitter configured to transmit optical signals, the optical transmitter comprising:
  one or more first optical sources coupled to an input waveguide and configured to emit light having different wavelengths through the input waveguide; and
  a Mach-Zehnder interferometer comprising:
    a first optical coupler configured to couple the emitted light from the input waveguide to first and second arms of respective first and second branches of the Mach-Zehnder interferometer;
    the first branch comprising:
      the first arm and third, fourth, and seventh arms;
      a second optical coupler configured to couple light from the first arm to the third and fourth arms;
      a first array of two or more second optical sources coupled to the third arm, each of the two or more second optical sources configured to be injection locked to a different respective wavelength of the emitted light transmitted from the one or more first optical sources;
      a third optical coupler configured to combine the emitted light from the third and fourth arms after propagating therethrough;
      the seventh arm coupled to the third coupler to receive the respective combined emitted light from the third coupler;
    the second branch comprising;
      the second arm and fifth, sixth, and eighth arms;
      a fourth optical coupler configured to couple light from the second arm to the fifth and sixth arms;
      a second array of two or more second optical sources coupled to the fifth arm, each of the two or more second optical sources configured to be injection locked to a different respective wavelength of the emitted light transmitted from the one or more first optical sources;
      a fifth optical coupler configured to combine the emitted light from the fifth and sixth arms after propagating therethrough;
      the eighth arm coupled to the fifth coupler to receive the respective combined emitted light from the fifth coupler; and
    a sixth optical coupler configured to combine the emitted light from the seventh and eighth arms after propagating therethrough.

17. The optical transmitter of claim 16, wherein a combined difference in path length between the first and second arms and the seventh and eighth arms is configured such that all wavelengths of the emitted light transmitted from the one or more first optical sources have a phase difference of 90 degrees between the first and second branches.

18. An optical system comprising:
  an optical transmitter comprising;
    one or more reference lasers coupled to an input waveguide and configured to emit light having different wavelengths through the input waveguide; and
    a Mach-Zehnder interferometer comprising:
      a first arm and a second arm;
      a first optical coupler configured to couple the emitted light from the input waveguide to the first and second arms;
      an array of two or more injection locked ring lasers coupled to the first arm, each of the two or more injection locked ring lasers configured to be injection locked to a different respective wavelength of the emitted light transmitted from the one or more reference lasers; and
      a second optical coupler configured to combine the emitted light from the first and second arms after propagating therethrough; and
  an optical receiver and an optical fiber coupling the optical transmitter to the optical receiver, the optical receiver configured to receive the combined light emitted from the optical transmitter via the optical fiber.

19. The optical system of claim 18, wherein the optical transmitter is formed on or within a first chip and the optical receiver is formed on or within a second chip such that the light emitted from the optical transmitter is transmitted off of the first chip and onto the second chip via the optical fiber.

20. The optical system of claim 18, wherein the one or more reference lasers and the array of two or more injection locked ring lasers are heterogeneously integrated on a silicon on insulator substrate.

\* \* \* \* \*